United States Patent
Zhong

(10) Patent No.: US 10,616,232 B2
(45) Date of Patent: Apr. 7, 2020

(54) NETWORK CONNECTION METHOD, HOTSPOT TERMINAL AND MANAGEMENT TERMINAL

(71) Applicant: Huawei Technologies Co., Ltd., Shenzhen (CN)

(72) Inventor: Zhen Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 17 days.

(21) Appl. No.: 14/996,000

(22) Filed: Jan. 14, 2016

(65) Prior Publication Data

US 2016/0127381 A1  May 5, 2016

Related U.S. Application Data

(63) Continuation of application No. PCT/CN2014/079036, filed on May 31, 2014.

(51) Int. Cl.
*H04L 29/06* (2006.01)
*H04L 29/08* (2006.01)
(Continued)

(52) U.S. Cl.
CPC ........ *H04L 63/102* (2013.01); *H04L 63/0876* (2013.01); *H04L 67/306* (2013.01);
(Continued)

(58) Field of Classification Search
CPC . H04L 63/102; H04L 63/0876; H04L 67/306; H04W 76/10; H04W 12/08; H04W 48/02; H04W 88/06; H04W 84/12
See application file for complete search history.

(56) References Cited

U.S. PATENT DOCUMENTS 8,116,287 B2 * 2/2012 Krantz .................. H04W 48/08
370/252
8,302,152 B1  10/2012 Hewinson
(Continued)

FOREIGN PATENT DOCUMENTS

CN         1842000 A    10/2006
CN       102204307 A     9/2011
(Continued)

*Primary Examiner* — Abu S Sholeman
(74) *Attorney, Agent, or Firm* — Leydig, Voit & Mayer, Ltd.

(57) ABSTRACT

Embodiments of the disclosure provide a network connection method, a hotspot terminal, and a management terminal. A hotspot terminal receives an Internet access request sent by a mobile terminal. The hotspot terminal sends an input request to the mobile terminal according to the received Internet access request. The hotspot terminal receives user identity information sent by the mobile terminal. The hotspot terminal receives a permission confirmation instruction that is entered by an administrator according to the user identity information. The hotspot terminal determines Internet access permission of the mobile terminal according to the received permission confirmation instruction. According to the network connection method provided in the embodiments of the disclosure, a problem where a process in which a mobile terminal logs in to a remote network by using a hotspot terminal becomes tedious and complex is resolved.

6 Claims, 9 Drawing Sheets

(51) Int. Cl.
*H04W 76/10* (2018.01)
*H04W 12/08* (2009.01)
*H04W 88/06* (2009.01)
*H04W 48/02* (2009.01)
*H04W 12/00* (2009.01)
*H04W 84/12* (2009.01)

(52) U.S. Cl.
CPC ............ *H04W 12/08* (2013.01); *H04W 76/10* (2018.02); *H04W 12/00403* (2019.01); *H04W 48/02* (2013.01); *H04W 84/12* (2013.01); *H04W 88/06* (2013.01)

(56) References Cited

U.S. PATENT DOCUMENTS

| | | | |
|---|---|---|---|
| 2005/0165953 A1* | 7/2005 | Oba | H04L 12/4633 709/238 |
| 2005/0198319 A1* | 9/2005 | Chan | G06F 21/31 709/228 |
| 2006/0018481 A1 | 1/2006 | Nagano et al. | |
| 2006/0288413 A1 | 12/2006 | Kubota | |
| 2007/0076875 A1 | 4/2007 | Kaechi | |
| 2007/0113269 A1 | 5/2007 | Zhang | |
| 2008/0172721 A1* | 7/2008 | Noh | G06F 21/41 726/4 |
| 2010/0046486 A1 | 2/2010 | Maruyama | |
| 2010/0268804 A1* | 10/2010 | Aso | H04L 29/12216 709/222 |
| 2011/0072501 A1 | 3/2011 | Fukui | |
| 2011/0163606 A1 | 7/2011 | Kumar et al. | |
| 2011/0252071 A1 | 10/2011 | Cidon | |
| 2012/0036557 A1 | 2/2012 | Li | |
| 2012/0082148 A1* | 4/2012 | Sperling | G06Q 30/04 370/338 |
| 2012/0266062 A1* | 10/2012 | Zhao | G06F 17/30899 715/234 |
| 2012/0323717 A1 | 12/2012 | Kirsch | |
| 2013/0074142 A1 | 3/2013 | Brennan et al. | |
| 2013/0210379 A1* | 8/2013 | Cloutier | H04W 76/10 455/405 |
| 2013/0219454 A1 | 8/2013 | Hewinson | |
| 2013/0272287 A1* | 10/2013 | Xiang | H04W 48/14 370/338 |
| 2014/0029512 A1* | 1/2014 | Chu | H04L 63/0892 370/328 |
| 2014/0036703 A1 | 2/2014 | Ding et al. | |
| 2014/0068098 A1 | 3/2014 | Anchan et al. | |
| 2014/0082610 A1* | 3/2014 | Wang | H04W 4/12 717/178 |
| 2014/0137206 A1 | 5/2014 | Hansmann et al. | |
| 2014/0171078 A1* | 6/2014 | Ryerson | H04W 48/18 455/435.2 |
| 2014/0181515 A1* | 6/2014 | Yang | H04W 12/06 713/168 |
| 2014/0348152 A1* | 11/2014 | Vanderhulst | H04W 4/00 370/338 |
| 2015/0055505 A1* | 2/2015 | Lai | H04W 4/12 370/254 |
| 2015/0082397 A1* | 3/2015 | Zhong | H04W 12/06 726/5 |
| 2015/0234843 A1* | 8/2015 | Matsumoto | G06F 21/6218 707/783 |

FOREIGN PATENT DOCUMENTS

| | | |
|---|---|---|
| CN | 102611597 A | 7/2012 |
| CN | 102791016 A | 11/2012 |
| CN | 102869014 A | 1/2013 |
| CN | 102883320 A | 1/2013 |
| CN | 103139705 A | 6/2013 |
| CN | 103181208 A | 6/2013 |
| CN | 103298072 A | 9/2013 |
| CN | 103476092 A | 12/2013 |
| CN | 103765855 A | 4/2014 |
| EP | 1560369 A2 | 8/2005 |
| JP | 2002077271 A | 3/2002 |
| JP | 2005039787 A | 2/2005 |
| JP | 2005244936 A | 9/2005 |
| JP | 2007104443 A | 4/2007 |
| JP | 2007257232 A | 10/2007 |
| JP | 2008017302 A | 1/2008 |
| JP | 2008066969 A | 3/2008 |
| JP | 2008263445 A | 10/2008 |
| JP | 2009017335 A | 1/2009 |
| JP | 2009100064 A | 5/2009 |
| JP | 2010109568 A | 5/2010 |
| JP | 2011065590 A | 3/2011 |
| JP | 2011205194 A | 10/2011 |
| JP | 2012054918 A | 3/2012 |
| JP | 2012186516 A | 9/2012 |
| JP | 2013515986 A | 5/2013 |
| JP | 2015532078 A | 11/2015 |
| WO | WO 03048957 A1 | 6/2003 |
| WO | 2005004385 A1 | 1/2005 |

* cited by examiner

NETWORK CONNECTION METHOD, HOTSPOT TERMINAL AND MANAGEMENT TERMINAL

CROSS-REFERENCE TO RELATED APPLICATIONS

This application is a continuation of International Patent Application No. PCT/CN2014/079036, filed on May 31, 2014, which is hereby incorporated by reference in its entirety.

TECHNICAL FIELD

Embodiments of the disclosure relate to the communications field, and in particular, to a network connection method, a hotspot terminal, and a management terminal.

BACKGROUND

With popularization of mobile terminals, a mobile terminal currently accesses a wireless local area network (WLAN) established by a hotspot terminal that is used as an application access point (AP), so as to implement data services, such as watching a video, browsing a web page, instant messaging, or listening to music. However, to ensure security of the mobile terminal that accesses the WLAN, an encrypted WLAN may be established on the hotspot terminal, and a correct password needs to be entered for the mobile terminal to access the WLAN established by the hotspot terminal.

In some application scenarios, when the mobile terminal accesses the encrypted WLAN established by the hotspot terminal, there is a problem such as difficulty in entering a password, or a password being too complex, or difficulty in acquiring a password, which causes a tedious process of accessing the encrypted WLAN by the mobile terminal.

SUMMARY

Embodiments of the disclosure provide a network connection method, a hotspot terminal, and a management terminal to implement a secure and convenient network connection.

According to a first aspect, a network connection method is provided. The method includes receiving, by a hotspot terminal, an Internet access request sent by a mobile terminal, where the Internet access request is sent to the hotspot terminal after the mobile terminal accesses, according to a service set identifier SSID of the hotspot terminal, an unencrypted wireless local area network WLAN established by the hotspot terminal. The method further involves sending, by the hotspot terminal, an input request to the mobile terminal according to the received Internet access request, where the input request is used to request the mobile terminal to send user identity information, and the user identity information is used to identify a user who uses the mobile terminal. The method then involves receiving, by the hotspot terminal, the user identity information sent by the mobile terminal; receiving, by the hotspot terminal, a permission confirmation instruction that is entered by an administrator according to the user identity information; and determining, by the hotspot terminal, Internet access permission of the mobile terminal according to the received permission confirmation instruction.

In a first possible implementation, the receiving, by a hotspot terminal, a permission confirmation instruction that is entered by an administrator according to the user identity information specifically includes: sending, by the hotspot terminal, the user identity information to a management terminal; and receiving, by the hotspot terminal, the permission confirmation instruction sent by the management terminal, where the permission confirmation instruction is entered by the administrator according to the user identity information displayed by the management terminal.

With reference to the first aspect, in a second possible implementation, the receiving, by the hotspot terminal, a permission confirmation instruction that is entered by an administrator according to the user identity information specifically includes: displaying, by the hotspot terminal, the user identity information; and receiving, by the hotspot terminal, the permission confirmation instruction that is entered by the administrator according to the user identity information.

With reference to the first aspect and any one of the foregoing possible implementations, in a third possible implementation, the user identity information includes at least one piece of information, for example, a user name, a user nickname, a user phone number, and user convention information.

With reference to the first aspect and any one of the foregoing possible implementations, in a fourth possible implementation, after the hotspot terminal determines the Internet access permission of the mobile terminal according to the received permission confirmation instruction, the hotspot terminal sets, according to a preset Internet access condition, an Internet access limitation of accessing the WLAN by the mobile terminal.

According to a second aspect, a network connection method is provided. The method includes receiving, by a management terminal, user identity information sent by a hotspot terminal, where the user identity information is used to identify a user who uses a mobile terminal, and the mobile terminal is a terminal that accesses an unencrypted wireless local area network WLAN established by the hotspot terminal and sends an Internet access request to the hotspot terminal. The method further involves displaying the user identity information by the management terminal; receiving, by the management terminal, a permission confirmation instruction that is entered by an administrator according to the user identity information displayed by the management terminal; and sending, by the management terminal, the permission confirmation instruction to the hotspot terminal, so that the hotspot terminal determines Internet access permission of the mobile terminal.

In a first possible implementation, after the management terminal sends the permission confirmation instruction to the hotspot terminal, the management terminal sets an Internet access condition of the mobile terminal and sends the set Internet access condition to the hotspot terminal.

With reference to the second aspect and the first possible implementation, in a second possible implementation manner, the user identity information includes at least one piece of information of a user name, a user nickname, a user phone number, and user convention information.

According to a third aspect, a hotspot terminal is provided. The hotspot terminal includes a communications module and a processor; where the processor is configured to establish an unencrypted wireless local area network WLAN. The communications module is configured to receive an Internet access request sent by a mobile terminal, where the Internet access request is sent to the hotspot terminal after the mobile terminal accesses, according to a service set identifier SSID of the hotspot terminal, the unencrypted wireless local area network WLAN established by the processor. The processor is further configured to instruct, according to the Internet access request received by the communications module, the communications module to send an input request to the mobile terminal, where the input request is used to request the mobile terminal to send user identity information, and the user identity information is used to identify a user who uses the mobile terminal. The communications module is further configured to receive the user identity information sent by the mobile terminal; and then the processor is further configured to receive a permission confirmation instruction that is entered by an administrator according to the user identity information, and determine Internet access permission of the mobile terminal according to the permission confirmation instruction.

In a first possible implementation, the communications module is further configured to send the user identity information to a management terminal, receive the permission confirmation instruction sent by the management terminal, and send the permission confirmation instruction to the processor, where the permission confirmation instruction is entered by the administrator according to the user identity information displayed by the management terminal.

In a second possible implementation, the hotspot terminal further includes a display module and an input module. The display module is configured to display the user identity information after the communications module receives the user identity information sent by the mobile terminal. When receiving the permission confirmation instruction that is entered by the administrator according to the user identity information, the processor is configured to receive, by using the input module, the permission confirmation instruction that is entered by the administrator according to the user identity information.

With reference to the third aspect and any one of the foregoing possible implementations, after the Internet access permission of the mobile terminal is determined according to the permission confirmation instruction, the processor is further configured to set, according to a preset Internet access condition, an Internet access limitation of accessing the WLAN by the mobile terminal.

With reference to the third aspect and any one of the foregoing possible implementation, the user identity information includes at least one piece of information of a user name, a user nickname, a user phone number, and user convention information.

According to a fourth aspect, a management terminal is provided. The management terminal includes a communications module, a display module, an input module, and a processor. The communications module is configured to receive user identity information sent by a hotspot terminal, and the user identity information is used to identify a user who uses a mobile terminal. The mobile terminal is a terminal that accesses an unencrypted wireless local area network WLAN established by the hotspot terminal and sends an Internet access request to the hotspot terminal. The display module is configured to display the user identity information. The processor is configured to receive, by using the input module, a permission confirmation instruction that is entered by an administrator according to the user identity information displayed by the display module. The processor is further configured to instruct, according to the permission confirmation instruction, the communications module to send the permission confirmation instruction to the hotspot terminal, so that the hotspot terminal determines Internet access permission of the mobile terminal.

In a first possible implementation, after the communications module sends the permission confirmation instruction to the hotspot terminal, the processor is further configured to set an Internet access condition of the mobile terminal, and the communications module is further configured to send the Internet access condition set by the processor to the hotspot terminal.

With reference to the fourth aspect and the first possible implementation, the user identity information includes at least one piece of information of a user name, a user nickname, a user phone number, and user convention information.

It can be learned from the foregoing technical solutions that, in the technical solutions of the embodiments of the disclosure, when a hotspot terminal receives an Internet access request of a mobile terminal, the hotspot terminal sends an input request to the mobile terminal. The hotspot terminal then receives a permission confirmation instruction that is entered by an administrator according to user identity information and determines Internet access permission of the mobile terminal according to the received permission confirmation instruction. The hotspot terminal can determine the Internet access permission of the mobile terminal according to the received permission confirmation instruction and provide a more convenient and efficient network connection method under the premise of ensuring that a process in which the mobile terminal accesses a wireless local area network established by the hotspot terminal is secure.

BRIEF DESCRIPTION OF DRAWINGS

To describe the technical solutions in the embodiments of the disclosure more clearly, the following briefly introduces the accompanying drawings required for describing the embodiments. Apparently, the accompanying drawings in the following description show merely some embodiments of the disclosure, and a person skilled in the art may still derive other drawings from these accompanying drawings without creative efforts.

DESCRIPTION OF EMBODIMENTS

The following clearly describes the technical solutions in the embodiments of the disclosure with reference to the accompanying drawings in the embodiments of the disclosure. Apparently, the described embodiments are merely some but not all of the embodiments of the present application. All other embodiments obtained by a person skilled in the art based on the embodiments of the disclosure without creative efforts shall fall within the protection scope of the present application.

Figure 1:
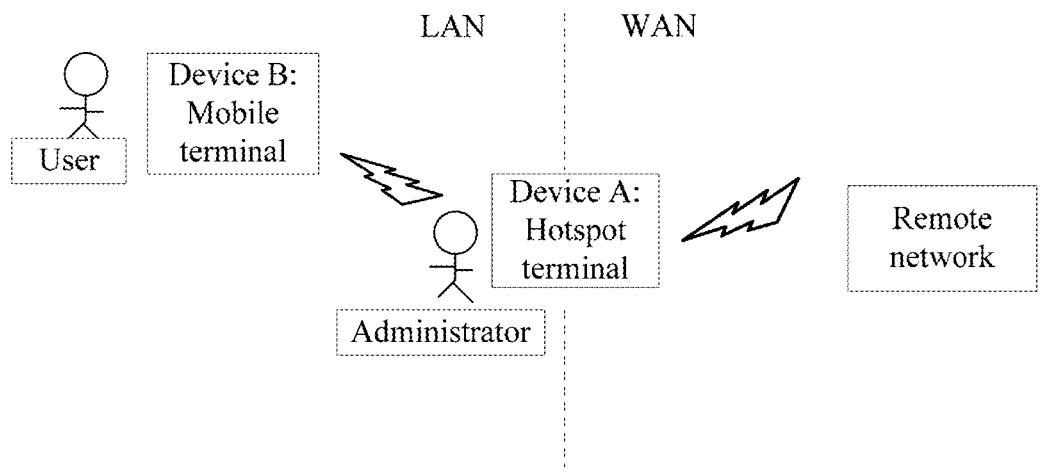
FIG. 1 is a schematic diagram of an application scenario in which a mobile terminal accesses a wireless local area network established by a hotspot terminal according to an embodiment of the disclosure.

FIG. 1 is a schematic diagram of an application scenario in which a mobile terminal accesses a wireless local area network established by a hotspot terminal according to an embodiment of the disclosure. As shown in FIG. 1, a device A is a hotspot terminal, and the device A is used as an application access point (AP) of a wide area network (WAN) to log in to a remote network. A device B is a mobile terminal on a local area network (LAN) side, and the mobile terminal accesses a wireless local area network (WLAN) established by the device A that is used as an AP, so as to implement data services, such as watching a video, browsing a web page, instant messaging, or listening to music. In the application scenario of this embodiment of the disclosure, a person who operates the device A is referred to as an administrator, and a person who operates the device B is referred to as a user.

Figure 2:
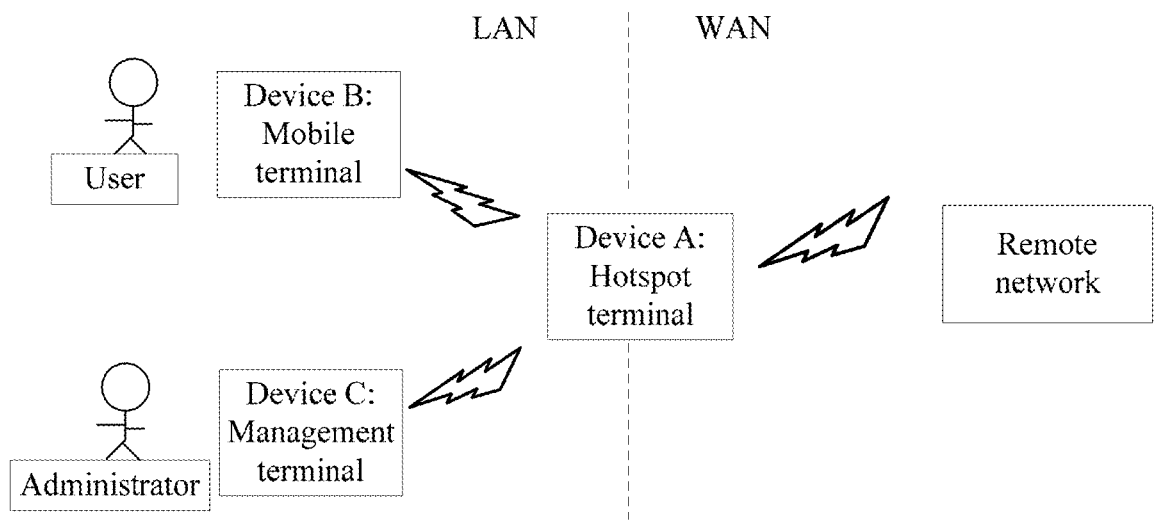
FIG. 2 is a schematic diagram of an application scenario in which a mobile terminal accesses a wireless local area network established by a hotspot terminal according to another embodiment of the disclosure.

FIG. 2 is a schematic diagram of an application scenario in which a mobile terminal accesses a wireless local area network established by a hotspot terminal according to another embodiment of the disclosure. As shown in FIG. 2, a device A is a hotspot terminal and is used as an application access point of a WAN to log in to a remote network. A device B is a mobile terminal on a LAN side, and the mobile terminal accesses a WLAN established by the device A that is used as an AP, so as to implement data services, such as watching a video, browsing a web page, instant messaging, or listening to music. A device C is a mobile terminal on the LAN side and is referred to as a management terminal. In the application scenario of this embodiment of the disclosure, a person who operates the device C is referred to as an administrator, and a person who operates the device B is referred to as a user.

A mobile terminal involved may be, for example, a mobile phone, a personal computer (PC), a tablet computer, a digital camera, and a game console. A hotspot terminal may be, for example, a wireless router, a portable router, a wireless modem, a mobile phone, a PC, a tablet computer, and a digital camera. A management terminal may be, for example, a mobile phone, a PC, a tablet computer, a digital camera, and a game console.

In the prior art, to ensure security of a mobile terminal that accesses a wireless local area network, a hotspot terminal establishes a wireless local area network for which a password is set. A correct password needs to be entered for the mobile terminal to access an encrypted WLAN established by the hotspot terminal, so as to implement a data service. In some application scenarios, when the mobile terminal accesses the encrypted WLAN established by the hotspot terminal, the following problems are likely to occur: it is difficult to enter the password, or it is difficult to acquire the password because the password is too complex; or any mobile terminal can access the encrypted WLAN when the password is disclosed. As a result, a process in which the mobile terminal accesses the encrypted WLAN established by the hotspot terminal is tedious and complex.

Figure 3:
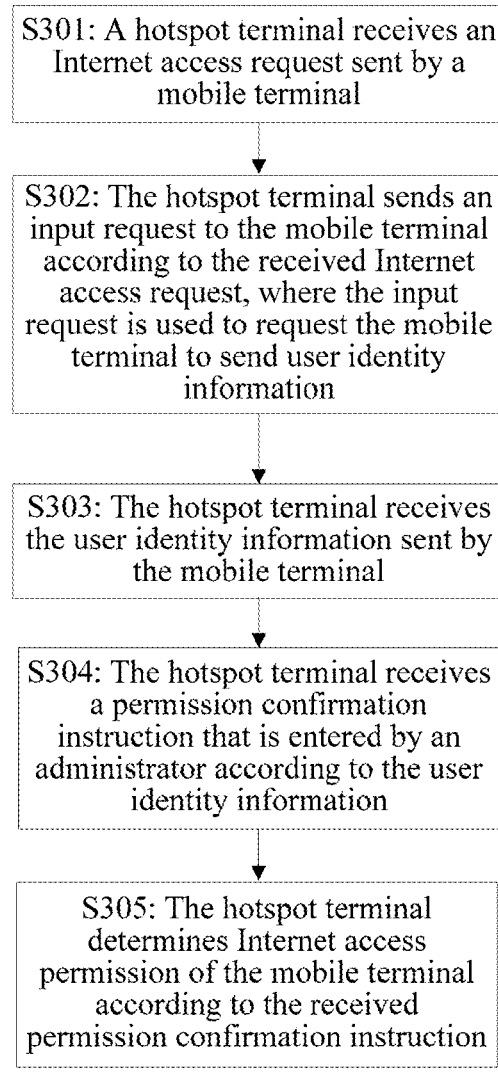
FIG. 3 is a schematic flowchart of a network connection method according to an embodiment of the disclosure.

FIG. 3 is a schematic flowchart of a network connection method according to an embodiment of the disclosure. The method includes the following steps:

S301. A hotspot terminal receives an Internet access request sent by a mobile terminal.

The Internet access request is sent to the hotspot terminal after the mobile terminal accesses, according to a service set identifier (SSID) of the hotspot terminal, an unencrypted WLAN established by the hotspot terminal. When the mobile terminal accesses, according to the SSID of the hotspot terminal, the unencrypted WLAN established by the hotspot terminal, the hotspot terminal acquires a MAC address of the mobile terminal, where the MAC address of the mobile terminal is used to uniquely identify the mobile terminal.

The SSID of the hotspot terminal may be broadcasted by the hotspot terminal using Wi-Fi, or may be broadcasted by the hotspot terminal in another manner, such as near field communication (NFC).

The Internet access request may be a request for logging in to a website, such as sina (a news website), yahoo, sohu (a video website), or youku (a video website); or a request for logging in to another application program that requires Internet access, such as MSN or QQ (a chat tool).

When the mobile terminal finds the SSID of the hotspot terminal, the mobile terminal requests to access, according to the found SSID of the hotspot terminal, the WLAN established by the hotspot terminal. The hotspot terminal establishes the unencrypted WLAN, that is, the mobile terminal may access, according to the SSID, the unencrypted WLAN established by the hotspot terminal in a case in which no password needs to be entered.

Figure 4:
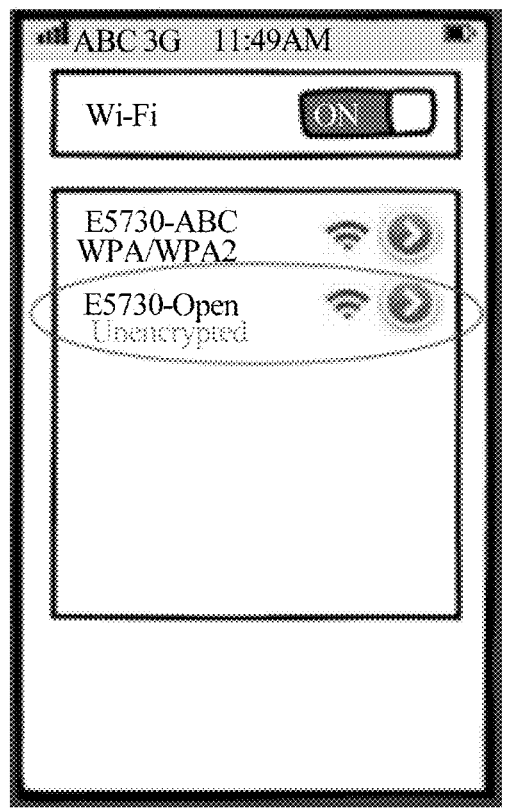
FIG. 4 is a schematic diagram of a user interface showing that a mobile terminal finds a service set identifier (SSID) of a hotspot terminal.

FIG. 4 is a schematic diagram of a user interface showing that a mobile terminal finds an SSID of a hotspot terminal. As shown in FIG. 4, the mobile terminal finds an SSID that does not require password entering: E5730-Open. And the mobile terminal may access, according to the E5730-Open, an unencrypted WLAN established by the hotspot terminal.

After the mobile terminal accesses the unencrypted WLAN established by the hotspot terminal, the mobile terminal sends, according to a user requirement such as watching a video, browsing a web page, instant messaging, or listening to music, an Internet access request to the hotspot terminal to request to log in to a remote network by using the hotspot terminal. For example, the mobile terminal requests to log in to sina, yahoo, sohu, or youku by using the hotspot terminal.

S302. The hotspot terminal sends an input request to the mobile terminal according to the received Internet access request, where the input request is used to request the mobile terminal to send user identity information.

When the hotspot terminal receives the Internet access request sent by the mobile terminal, the hotspot terminal sends the input request to the mobile terminal according to the received Internet access request. Specifically, the mobile terminal requests to log in to a remote network by using the hotspot terminal, and the hotspot terminal prevents, according to the received Internet access request, the mobile terminal from logging in to the remote network, and sends the input request to the mobile terminal to request the mobile terminal to send the user identity information. The user identity information is used to identify a user who uses the mobile terminal, and the user identity information may include at least one piece of information selected from the group consisting of: a user name, a user nickname, a user phone number, and user convention information. The foregoing at least one piece of information is used to enable an administrator to distinguish an identity of the user.

Figure 5A:
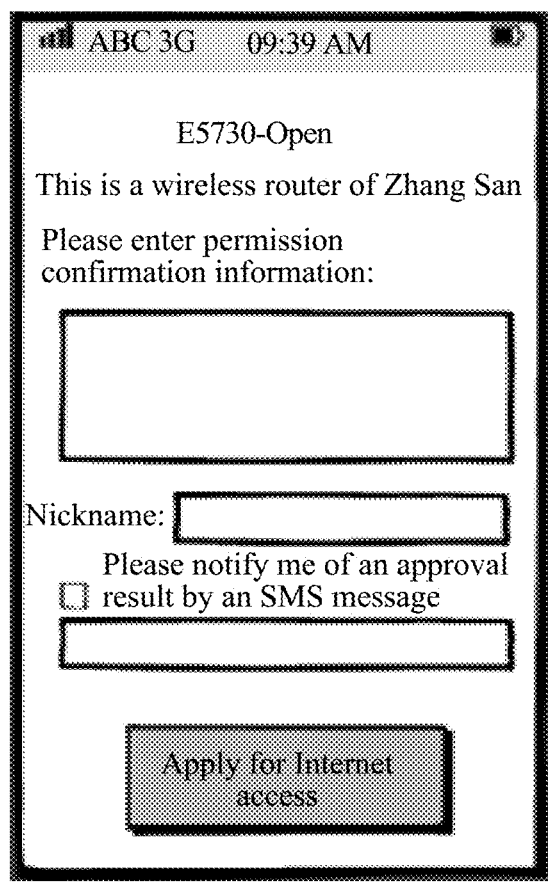
FIG. 5A is a schematic diagram of an user interface showing that a hotspot terminal sends an input request to a mobile terminal.

In another embodiment of the disclosure, the hotspot terminal prevents, according to the received Internet access request, the mobile terminal from logging in to the remote network and sends the input request to the mobile terminal, which may be implemented by the hotspot terminal in a redirection manner. That is, the hotspot terminal redirects the Internet access request sent by the mobile terminal to the input request in the redirection manner. For example, the mobile terminal requests to log in to sina, and the hotspot terminal sends an input request to the mobile terminal in the redirection manner; FIG. 5A is an example of a specific display user interface of the input request.

FIG. 5A is a schematic diagram of a user interface showing that a hotspot terminal sends an input request to a mobile terminal. As shown in FIG. 5A, the hotspot terminal sends, according to the received Internet access request, the input request to the mobile terminal to request the mobile terminal to send the user identity information.

The user identity information that is required to be entered is displayed on the schematic diagram of the user interface in FIG. 5A, and for example, may include any one or more of the following information: permission application information, a nickname, and a user phone number.

S303. The hotspot terminal receives the user identity information sent by the mobile terminal.

The user identity information may be, for example, at least one piece of information of a user name, a user nickname, a user phone number, and user convention information. The user convention information may be any information about a convention between the user and the administrator, such as a piece of specific text and a string of specific numbers.

Figure 5B:
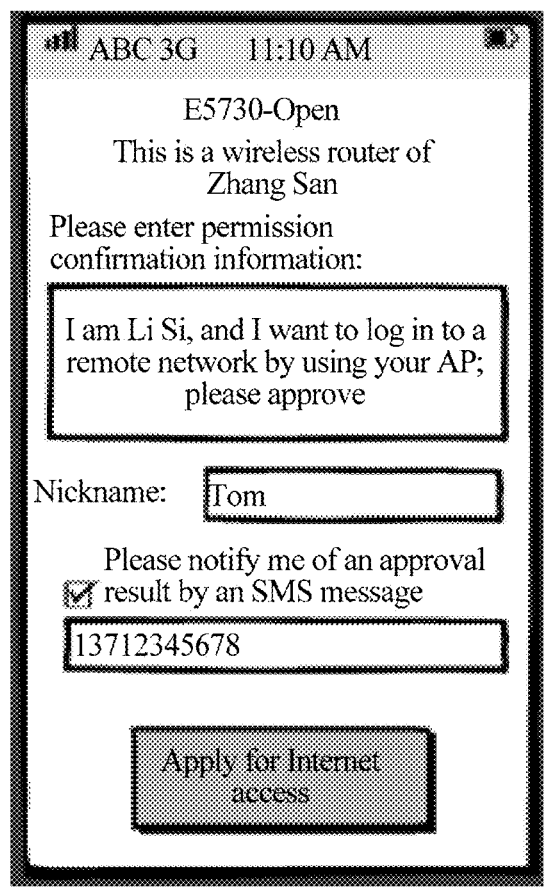
FIG. 5B is a schematic diagram of an user interface showing that a user enters user identity information according to an input request user interface.

FIG. 5B is a schematic diagram of a user interface of user identity information that is sent by a mobile terminal and received by a hotspot terminal. The schematic diagram of the user interface in FIG. 5B is used as an example for description.

A user enters user identity information according to the user identity information that is displayed on the user interface and requires to be entered. For example, the entered user identity information includes that permission application information is "I am Li Si, and I want to log in to a remote network by using your AP; please approve" and that a nickname is "Tom". The user identity information sent by the mobile terminal to the hotspot terminal is the permission application information "I am Li Si, and I want to log in to a remote network by using your AP; please approve" and the nickname "Tom".

It should be noted that a display user interface of the mobile terminal may further include other content, such as "Please notify me of an approval result by an SMS message", and the user may choose whether to receive the approval result by an SMS message; if the user chooses to receive the approval result by an SMS message, the user may fill in a phone number for receiving the SMS message. In addition, the display user interface of the mobile terminal may further include description about a current WLAN, such as "E5730-Open", and "This is a wireless router of Zhang San".

S304. The hotspot terminal receives a permission confirmation instruction that is entered by an administrator according to the user identity information.

Similarly, the schematic diagram of the user interface in FIG. 5B is used as an example for description. After the user enters the user identity information and the user clicks for confirmation (for example, clicks "Apply for Internet access"), the hotspot terminal receives the user identity information sent by the mobile terminal, and the user identity information displayed on the user interface includes the permission application information "I am Li Si, and I want to log in to a remote network by using your AP; please approve" and the nickname "Tom".

Optionally, the user identity information sent by the mobile terminal may include only the permission application information, or may include only the nickname, or may be other identity information that is used to enable the administrator to identify the user, for example, at least one of a user name, a user phone number, or user convention information.

There may be two manners in which the hotspot terminal receives the permission confirmation instruction that is entered by the administrator according to the user identity information.

One manner is as follows: The hotspot terminal sends the user identity information to a management terminal, and the hotspot terminal receives the permission confirmation instruction sent by the management terminal, where the permission confirmation instruction is entered by the administrator according to the user identity information displayed by the management terminal.

For example, the hotspot terminal sends the user identity information to the management terminal, and the user identity information includes "I am Li Si, and I want to log in to a remote network by using your AP; please approve" and the nickname "Tom".

The user identity information displayed on a user interface of the management terminal includes the permission application information "I am Li Si, and I want to log in to a remote network by using your AP; please approve" and the nickname "Tom". According to the user identity information displayed by the management terminal, including the permission application information "I am Li Si, and I want to log in to a remote network by using your AP; please approve" and the nickname "Tom", the administrator enters the permission confirmation instruction by operating a touchscreen of the management terminal, or pressing a physical button of the management terminal, or in another manner.

In the other manner, receiving, by the hotspot terminal, the permission confirmation instruction that is entered by the administrator according to the user identity information includes: displaying, by the hotspot terminal, the user identity information, and receiving, by the hotspot terminal, the permission confirmation instruction that is entered by the administrator according to the user identity information.

For example, the user identity information is displayed on a user interface of the hotspot terminal, and the user identity information includes the permission application information "I am Li Si, and I want to log in to a remote network by using your AP; please approve" and the nickname "Tom".

According to the user identity information displayed by the hotspot terminal, including the permission application information "I am Li Si, and I want to log in to a remote network by using your AP; please approve" and the nickname "Tom", the administrator enters the permission confirmation instruction by operating a touchscreen of the hotspot terminal, or pressing a physical button of the hotspot terminal, or in another manner.

S305. The hotspot terminal determines Internet access permission of the mobile terminal according to the received permission confirmation instruction.

The hotspot terminal determines, according to the received permission confirmation instruction that is entered by the administrator according to the user identity information, whether the mobile terminal can log in to a remote network by using the hotspot terminal.

In this embodiment of the disclosure, when a hotspot terminal receives an Internet access request of a mobile terminal, the hotspot terminal sends an input request to the mobile terminal. Then the hotspot terminal receives a permission confirmation instruction that is entered by an administrator according to user identity information, and determines Internet access permission of the mobile terminal according to the received permission confirmation instruction. Thus, the problem where entering a password when the mobile terminal logs in to a remote network by using the hotspot terminal becomes complex and tedious is resolved. A convenient and efficient method for performing network connection by the mobile terminal by using the hotspot terminal is provided under the premise of ensuring that the mobile terminal can securely log in to the remote network by using the hotspot terminal.

Figure 6:
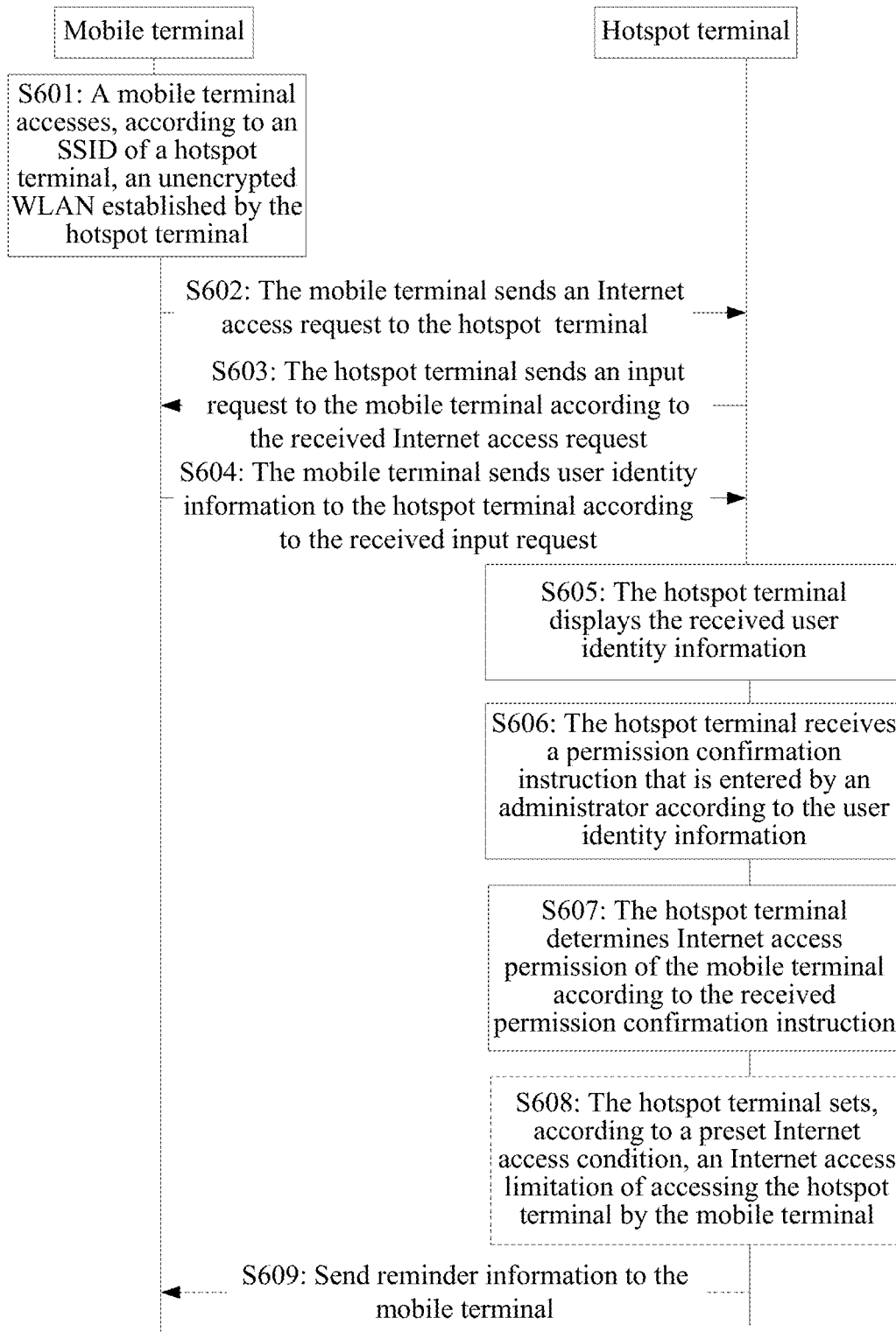
FIG. 6 is a schematic flowchart of a network connection method according to another embodiment of the disclosure.

FIG. 6 is a schematic flowchart of a network connection method according to another embodiment of the disclosure. The method includes the following steps:

S601. A mobile terminal accesses, according to an SSID of a hotspot terminal, an unencrypted WLAN established by the hotspot terminal.

The hotspot terminal establishes the unencrypted WLAN, that is, the mobile terminal may access, according to the SSID, the unencrypted WLAN established by the hotspot terminal in a case in which no password needs to be entered. For example, the mobile terminal finds an SSID that does not require password entering: E5730-Open, and the mobile terminal may access, according to the E5730-Open, an unencrypted WLAN established by the hotspot terminal.

The SSID of the hotspot terminal may be broadcasted by the hotspot terminal using Wi-Fi, or may be broadcasted by the hotspot terminal in another manner, such as NFC.

When the mobile terminal accesses, according to the SSID of the hotspot terminal, the unencrypted WLAN established by the hotspot terminal, the hotspot terminal acquires a MAC address of the mobile terminal, where the MAC address of the mobile terminal is used to uniquely identify the mobile terminal.

S602. The mobile terminal sends an Internet access request to the hotspot terminal.

The Internet access request may be specifically a request for logging in to a website, such as sina (a news website), yahoo, sohu (a video website), or youku (a video website); or a request for logging in to another application program that requires Internet access, such as MSN or QQ (a chat tool).

After the mobile terminal accesses the unencrypted WLAN established by the hotspot terminal, the mobile terminal sends, according to a user requirement such as watching a video, browsing a web page, instant messaging, or listening to music, an Internet access request to the hotspot terminal to request to log in to a remote network by using the hotspot terminal. For example, the mobile terminal requests to log in to sina, yahoo, sohu, youku, or the like by using the hotspot terminal.

S603. The hotspot terminal sends an input request to the mobile terminal according to the received Internet access request.

The input request is used to request the mobile terminal to send user identity information.

When the hotspot terminal receives the Internet access request sent by the mobile terminal, the hotspot terminal sends the input request to the mobile terminal according to the received Internet access request. Specifically, the mobile terminal requests to log in to a remote network by using the hotspot terminal, and the hotspot terminal prevents, according to the received Internet access request, the mobile terminal from logging in to the remote network, and sends the input request to the mobile terminal to request the mobile terminal to send the user identity information. The user identity information is used to identify a user who uses the mobile terminal, and the user identity information includes at least one piece of information selected from the group consisting of: a user name, a user nickname, a user phone number, and user convention information.

In another embodiment of the disclosure, the hotspot terminal prevents, according to the received Internet access request, the mobile terminal from logging in to the remote network and sends the input request to the mobile terminal, which may be implemented by the hotspot terminal in a redirection manner. That is, the hotspot terminal redirects the Internet access request sent by the mobile terminal to the input request in the redirection manner. For example, the mobile terminal requests to log in to sina, and the hotspot terminal sends an input request to the mobile terminal in the redirection manner; FIG. 5A is an example of a specific display user interface of the input request.

S604. The mobile terminal sends user identity information to the hotspot terminal according to the received input request.

The user identity information may be, for example, at least one piece of information including a user name, a user nickname, a user phone number, and user convention information.

S605. The hotspot terminal displays the received user identity information.

A schematic diagram of an user interface in FIG. 5B is used as an example for description, and permission application information that is entered by the user according to a requirement displayed on the user interface is "I am Li Si, and I want to log in to a remote network by using your AP; please approve." The user identity information sent by the mobile terminal to the hotspot terminal is the permission application information "I am Li Si, and I want to log in to a remote network by using your AP; please approve" and a nickname "Tom".

S606. The hotspot terminal receives a permission confirmation instruction that is entered by an administrator according to the user identity information.

The administrator enters the permission confirmation instruction according to the user identity information displayed by the hotspot terminal.

For example, the user identity information is displayed on a user interface of the hotspot terminal, and the user identity information includes the permission application information "I am Li Si, and I want to log in to a remote network by using your AP; please approve" and the nickname "Tom".

According to the user identity information displayed by the hotspot terminal, where the user identity information includes the permission application information "I am Li Si, and I want to log in to a remote network by using your AP; please approve" and the nickname "Tom", the administrator enters the permission confirmation instruction by operating a touchscreen of the hotspot terminal, or pressing a physical button of the hotspot terminal, or in another manner.

S607. The hotspot terminal determines Internet access permission of the mobile terminal according to the received permission confirmation instruction.

The hotspot terminal determines, according to the received permission confirmation instruction that is entered by the administrator according to the user identity information, whether the mobile terminal can log in to a remote network by using the hotspot terminal.

In another embodiment of the disclosure, after the hotspot terminal performs step S607 and determines that the mobile terminal has the Internet access permission, the hotspot terminal may further perform step S608.

S608. The hotspot terminal sets, according to a preset Internet access condition, an Internet access limitation of accessing the hotspot terminal by the mobile terminal.

The Internet access limitation may be specifically time of accessing the unencrypted WLAN established by the hotspot terminal, or an Internet access range, or a bandwidth limitation.

Optionally, the Internet access limitation may be set by the administrator, or the Internet access limitation may be set according to a result of searching for, by the hotspot terminal according to the MAC address of the mobile terminal, an Internet access condition of the mobile terminal in a pre-stored whitelist.

According to MAC addresses of mobile terminals, the hotspot terminal may set time of accessing, by different mobile terminals, the unencrypted WLAN established by the hotspot terminal, or set Internet access ranges of different mobile terminals, or set bandwidth limitations of different mobile terminals, as shown in Table 1.

TABLE 1

| | | Example: | |
|---|---|---|---|
| MAC address | Access time | Internet access range | Bandwidth limitation |
| 44-45-53-54-00-00 | 10 min | Limited to a news web page | 2 Mbit/s |
| 44-45-53-54-00-01 | 30 min | Limited to a news web page | 10 Mbit/s |

For a mobile terminal that has Internet access permission, which is determined by the hotspot terminal, the hotspot terminal may establish a whitelist. When the mobile terminal in the whitelist sends an Internet access request again, the hotspot terminal may search the whitelist and determine Internet access permission and an Internet access limitation of the mobile terminal according to the whitelist.

In another embodiment of the disclosure, after the hotspot terminal performs step S607 and determines the Internet access permission of the mobile terminal, the hotspot terminal may further perform step S609.

S609. The hotspot terminal sends reminder information to the mobile terminal.

The reminder information is used to inform whether the Internet access request of the mobile terminal is approved.

In this embodiment of the disclosure, when a hotspot terminal receives an Internet access request of a mobile terminal, the hotspot terminal sends an input request to the mobile terminal, and the hotspot terminal receives a permission confirmation instruction that is entered by an administrator according to user identity information, and determines Internet access permission of the mobile terminal according to the received permission confirmation instruction. Thus, the problem where entering a password when the mobile terminal logs in to a remote network by using the hotspot terminal becomes complex and tedious is resolved. A convenient and efficient method for performing network connection by the mobile terminal by using the hotspot terminal is provided under the premise of ensuring that the mobile terminal can securely log in to the remote network by using the hotspot terminal. Furthermore, after the hotspot terminal determines that a mobile terminal has Internet access permission, the hotspot terminal details Internet access limitations of different mobile terminals according to different MAC addresses of the mobile terminals. The hotspot further sends reminder information to the mobile terminals to inform whether Internet access requests of the mobile terminals are approved; different Internet access limitations are set according to different mobile terminals under the premise of ensuring that the mobile terminals log in to a remote network by using the hotspot terminal, so that the mobile terminals can efficiently and quickly log in to the remote network.

Figure 7:
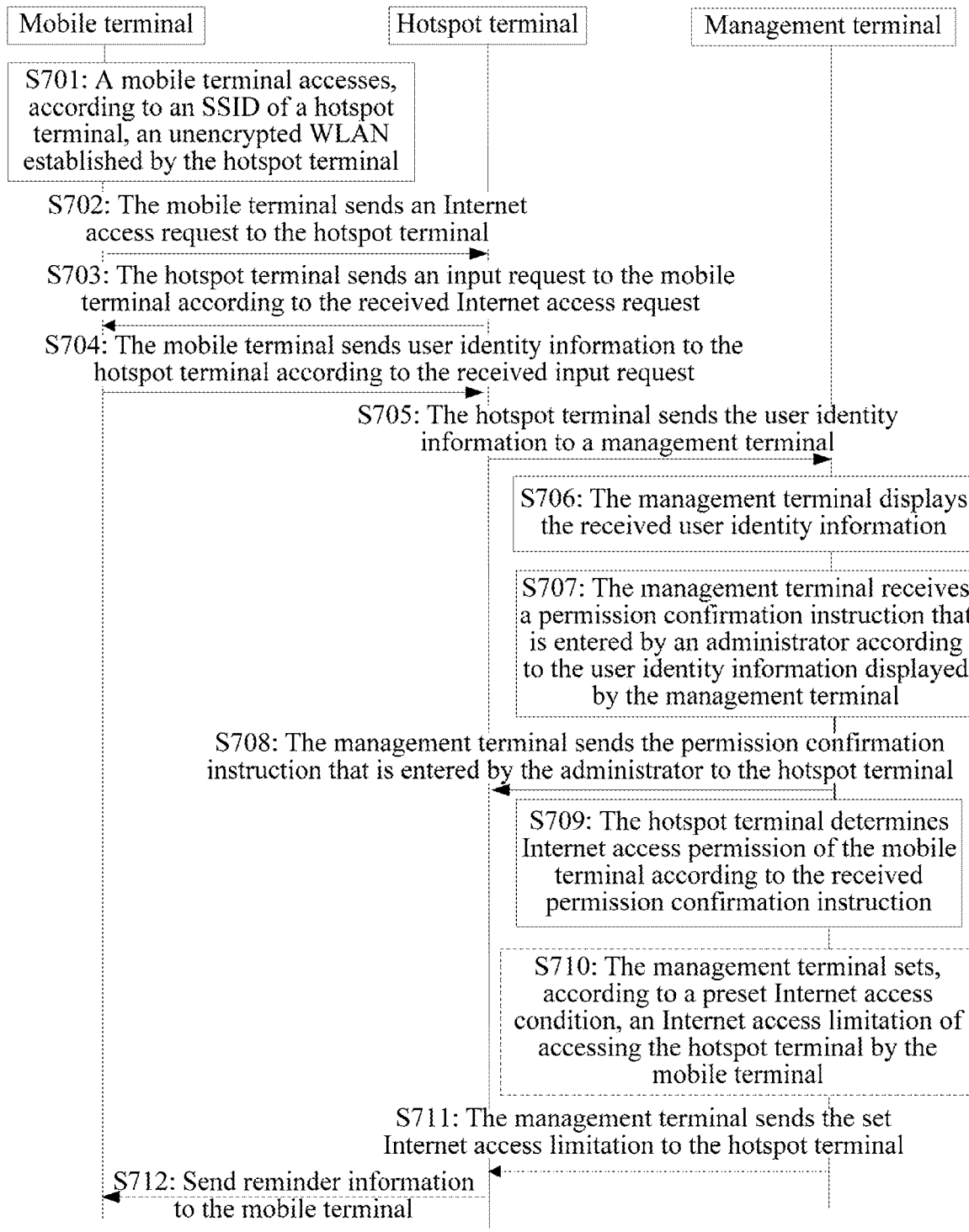
FIG. 7 is a schematic flowchart of a network connection method according to another embodiment of the disclosure.

FIG. 7 is a schematic flowchart of a network connection method according to another embodiment of the disclosure. The method includes the following steps:

S701. A mobile terminal accesses, according to an SSID of a hotspot terminal, an unencrypted WLAN established by the hotspot terminal.

S702. The mobile terminal sends an Internet access request to the hotspot terminal.

S703. The hotspot terminal sends an input request to the mobile terminal according to the received Internet access request.

S704. The mobile terminal sends user identity information to the hotspot terminal according to the received input request.

Steps S701-S704 are respectively the same as steps S601-S604 in the embodiment shown in FIG. 6, and for example implementations, refer to description in steps S601-S604.

S705. The hotspot terminal sends the user identity information to a management terminal.

The user identity information may be, for example, at least one piece of information including a user name, a user nickname, a user phone number, and user convention information.

S706. The management terminal displays the received user identity information.

Similarly, a schematic diagram of an user interface in FIG. 5B is used as an example for description, and when an user interface of the management terminal displays the user interface shown in FIG. 5B, the user identity information displayed on the user interface includes permission application information "I am Li Si, and I want to log in to a remote network by using your AP; please approve" and a nickname "Tom".

S707. The management terminal receives a permission confirmation instruction that is entered by an administrator according to the user identity information displayed by the management terminal.

The administrator enters the permission confirmation instruction according to the user identity information displayed by the management terminal.

For example, according to the user identity information displayed by the management terminal, including the permission application information "I am Li Si, and I want to log in to a remote network by using your AP; please approve" and the nickname "Tom", the administrator enters the permission confirmation instruction by operating a touchscreen of the management terminal, or pressing a physical button of the management terminal, or in another manner.

S708. The management terminal sends the permission confirmation instruction that is entered by the administrator to the hotspot terminal.

S709. The hotspot terminal determines Internet access permission of the mobile terminal according to the received permission confirmation instruction.

The hotspot terminal determines, according to the received permission confirmation instruction that is entered by the administrator according to the user identity information, whether the mobile terminal can log in to a remote network by using the hotspot terminal.

In another embodiment of the disclosure, after the management terminal performs step S709 and determines the mobile terminal has the Internet access permission, the management terminal may further perform step S710.

S710. The management terminal sets, according to a preset Internet access condition, an Internet access limitation of accessing the hotspot terminal by the mobile terminal.

The Internet access limitation may be time of accessing the unencrypted WLAN established by the hotspot terminal, Internet access ranges that are set for different mobile terminals, or bandwidth limitations that are set for different mobile terminals.

Optionally, the Internet access limitation may be set by the administrator, or the Internet access limitation may be set according to a result of searching for, by the hotspot terminal according to a MAC address of the mobile terminal, an Internet access condition of the mobile terminal in a pre-stored whitelist.

According to MAC addresses of mobile terminals, the management terminal may set time of accessing, by different mobile terminals, the unencrypted WLAN established by the hotspot terminal, or set Internet access ranges of different mobile terminals, or set bandwidth limitations of different mobile terminals. Alternatively, the management terminal detects distances between mobile terminals and the hotspot terminal, and sets different Internet access permission of the mobile terminals according to the detected distances between the mobile terminals and the hotspot terminal, as shown in Table 2.

TABLE 2

Example:

| MAC address | Access time | Internet access range | Bandwidth limitation | Distance |
| --- | --- | --- | --- | --- |
| 44-45-53-54-00-00 | 10 min | Limited to a news web page | 2 Mbit/s | 2 m, 10 Mbit/s allowed |
| 44-45-53-54-00-01 | 30 min | Limited to a news web page | 10 Mbit/s | 10 m, 2 Mbit/s allowed |

The management terminal may establish a whitelist including mobile terminals that the Internet access permission, which is determined by the management terminal. And the management terminal may send the whitelist to the hotspot terminal.

S711. The management terminal sends the set Internet access limitation to the hotspot terminal.

The management terminal may send, to the hotspot terminal, time of connecting to a network by different mobile terminals by using the hotspot terminal, Internet access ranges of different mobile terminals, or bandwidth limitations of different mobile terminals, which are set according to MAC addresses of the mobile terminals. The management terminal may also send a whitelist of mobile terminals that have the Internet access permission to the hotspot terminal.

In another embodiment of the disclosure, after the hotspot terminal performs step S709 and determines that the mobile terminal has the Internet access permission, the hotspot terminal may further perform step S712.

S712. The hotspot terminal sends reminder information to the mobile terminal.

The reminder information is used to inform whether the Internet access request of the mobile terminal is approved.

In this embodiment of the disclosure, when a hotspot terminal receives an Internet access request of a mobile terminal, the hotspot terminal sends an input request to the mobile terminal. Then the hotspot terminal receives a permission confirmation instruction that is entered by an administrator according to user identity information, and determines Internet access permission of the mobile terminal according to the received permission confirmation instruction. Thus, the problem where entering a password when the mobile terminal logs in to a remote network by using the hotspot terminal becomes complex and tedious is resolved. A convenient and efficient method for performing network connection by the mobile terminal by using the hotspot terminal is provided under the premise of ensuring that the mobile terminal can securely log in to the remote network by using the hotspot terminal. Furthermore, after a management terminal determines that a mobile terminal has the Internet access permission, the management terminal details Internet access limitations of different mobile terminals according to different MAC addresses of the mobile terminals, and sends the set Internet access limitations to the hotspot terminal. The hotspot terminal sends reminder information to the mobile terminals to inform whether Internet access requests of the mobile terminals are approved; different Internet access limitations are set according to different mobile terminals under the premise of ensuring that the mobile terminals log in to a remote network by using the hotspot terminal, so that the mobile terminals efficiently and quickly log in to the remote network.

Figure 8:
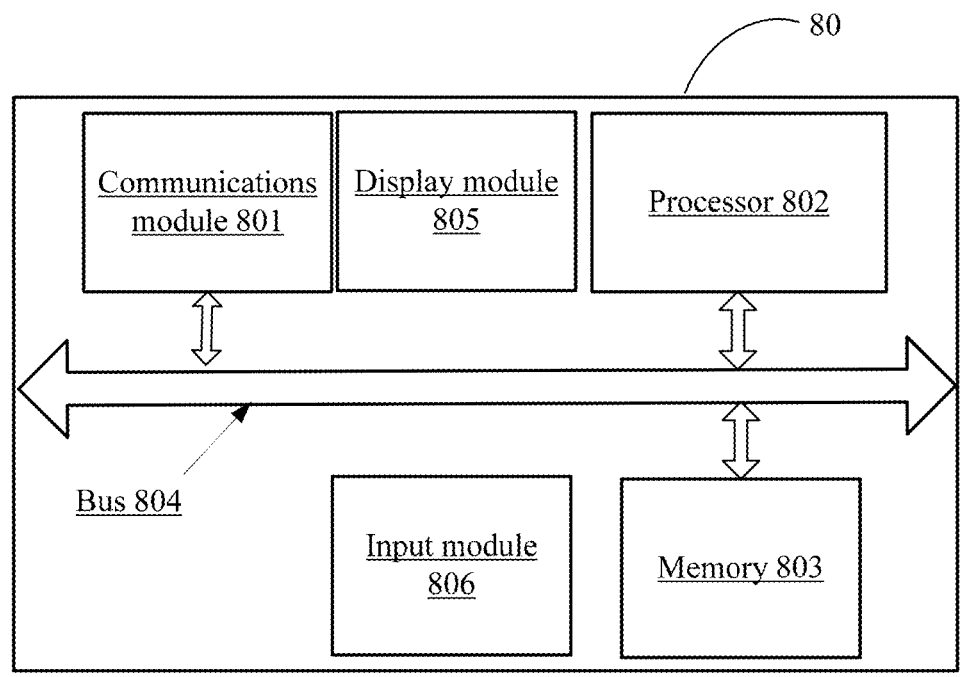
FIG. 8 is a schematic structural diagram of a hotspot terminal 80 according to an embodiment of the disclosure.

FIG. 8 is a schematic structural diagram of a hotspot terminal 80 according to an embodiment of the disclosure, where the hotspot terminal 80 includes parts such as a communications module 801, a processor 802, a memory 803, a bus 804, a display module 805, and an input module 806.

The communications module 801 may be a Wi-Fi chip or an integrated chip with a Wi-Fi function, and may be a Wi-Fi chip that supports at least one of protocols 802.11a, 802.11b, 802.11g, 802.11n, and 802.11ac, or a composite chip that integrates a Wi-Fi function.

The memory 803 may include a random access memory (RAM) and a read only memory (ROM), or any fixed storage medium, or a removable storage medium, and is configured to store a program that can execute an embodiment of the present invention or application data in an embodiment of the present invention. By using the bus 804, the memory 803 receives input from other components, or stored information, such as an Internet access request sent by a mobile terminal or user identity information sent by a mobile terminal, is invoked by other components.

Figure 9:
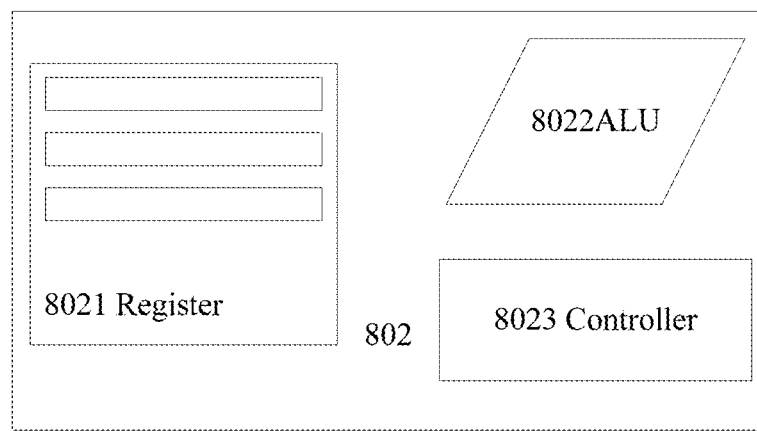
FIG. 9 is a schematic structural diagram of a processor 802 according to an embodiment of the disclosure.

As shown in FIG. 9, the processor 802 includes an arithmetic logic unit (ALU) 8022, a register 8021, and a controller 8023, where the ALU 8022 is responsible for various calculations that the processor 802 can perform. The register 8021 is configured to temporarily store code and data in a program execution process. The controller 8023 is configured to control instruction execution and information transmission.

The processor 802 is configured to execute a program, stored in the memory 803, of an embodiment of the disclosure, and implement bidirectional communication with another unit by using the bus 804.

The display module 805 may be configured to display information that is entered by a user or information that is provided for a user. The input module 806 may be configured to receive an input instruction of a user or provide an interface for external input.

The memory 803 and the processor 802 may be further integrated into a physical module for applying an embodiment of the disclosure, and a program that implements the embodiment of the disclosure is stored and run on the physical module.

All components of the hotspot terminal 80 are coupled together by using the bus 804, where the bus 804 includes a data bus, and may further include a power bus, a control bus, a status signal bus, and the like. However, for clarity of description, various buses are marked as the bus 804 in the diagram.

In this embodiment of the disclosure, units of the hotspot terminal 80 separately execute the following content.

The processor 802 is configured to establish an unencrypted WLAN.

The communications module 801 is configured to receive an Internet access request sent by a mobile terminal, where the Internet access request is sent to the hotspot terminal 80 after the mobile terminal accesses, according to a service set identifier SSID of the hotspot terminal 80, the unencrypted wireless local area network WLAN established by the processor 802.

The processor 802 is further configured to instruct, according to the received Internet access request, the communications module 801 to send an input request to the mobile terminal, where the input request is used to request the mobile terminal to send user identity information, and the user identity information is used to identify a user who uses the mobile terminal.

The communications module 801 is further configured to receive the user identity information sent by the mobile terminal. The user identity information includes at least one piece of information, for example, a user name, a user nickname, a user phone number, and user convention information.

The processor 802 is further configured to receive a permission confirmation instruction that is entered by an administrator according to the user identity information, and determine Internet access permission of the mobile terminal according to the permission confirmation instruction received by the communications module 801.

The memory 803 is configured to store the Internet access request received by the communications module, an instruction sent by the processor to the communications module, and the received user identity information.

In another embodiment of the disclosure, the communications module 801 is further configured to send the user identity information to a management terminal, receive the permission confirmation instruction sent by the management terminal, and send the permission confirmation instruction to the processor, where the permission confirmation instruction is entered by the administrator according to the user identity information displayed by the management terminal.

In another embodiment of the disclosure, the display module 805 is configured to display the user identity information after the communications module 801 receives the user identity information sent by the mobile terminal.

When receiving the permission confirmation instruction that is entered by the administrator according to the user identity information, the processor 802 is configured to receive, by using the input module 806, the permission confirmation instruction that is entered by the administrator according to the user identity information.

In another embodiment of the disclosure, after the Internet access permission of the mobile terminal is determined according to the permission confirmation instruction, the processor 802 is further configured to set, according to a preset Internet access condition, an Internet access limitation of accessing the WLAN by the mobile terminal.

In another embodiment of the disclosure, the processor 802 is further configured to send reminder information to the mobile terminal after the Internet access permission of the mobile terminal is determined, where the reminder information is used to inform whether the Internet access request of the mobile terminal is approved.

For the purpose of convenient and brief description, the hotspot terminal in this embodiment of the disclosure is configured to execute a method in the foregoing method embodiments; for details, refer to a corresponding process in the foregoing method embodiments, and details are not described herein again.

In this embodiment of the disclosure, when a hotspot terminal receives an Internet access request of a mobile terminal, the hotspot terminal sends an input request to the mobile terminal, and the hotspot terminal receives a permission confirmation instruction that is entered by an administrator according to user identity information, and determines Internet access permission of the mobile terminal according to the received permission confirmation instruction. Thus, the problem where entering a password when the mobile terminal logs in to a remote network by using the hotspot terminal becomes complex and tedious is resolved. A convenient and efficient method for performing network connection by the mobile terminal by using the hotspot terminal is provided under the premise of ensuring that the mobile terminal can securely log in to the remote network by using the hotspot terminal. Furthermore, after a management terminal determines that a mobile terminal has the Internet access permission, the management terminal details Internet access limitations of different mobile terminals according to different MAC addresses of the mobile terminals and sends the set Internet access limitations to the hotspot terminal. The hotspot terminal sends reminder information to the mobile terminals to inform whether Internet access requests of the mobile terminals are approved; different Internet access limitations are set according to different mobile terminals under the premise of ensuring that the mobile terminals log in to a remote network by using the hotspot terminal, so that the mobile terminals efficiently and quickly log in to the remote network.

Figure 10:
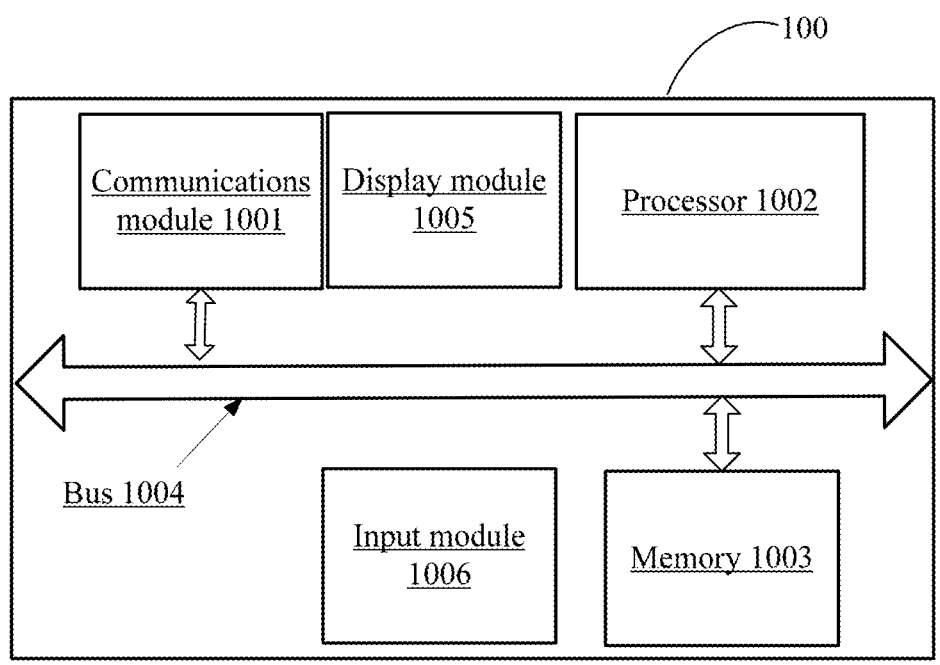
FIG. 10 is a schematic structural diagram of a management terminal 100 according to an embodiment of the disclosure.

FIG. 10 is a schematic structural diagram of a management terminal 100 according to an embodiment of the present invention, where the management terminal 100 includes parts such as a communications module 1001, a processor 1002, a memory 1003, a bus 1004, a display module 1005, and an input module 1006.

The communications module 1001 may be a Wi-Fi chip or an integrated chip with a Wi-Fi function, and may be a Wi-Fi chip that supports at least one of protocols 802.11 a, 802.11 b, 802.11g, 802.11n, and 802.11ac, or a composite chip that integrates a Wi-Fi function.

The memory 1003 may include a RAM and a ROM, or any fixed storage medium, or a removable storage medium, and is configured to store a program that can execute an embodiment of the present invention or application data in an embodiment of the present invention. By using the bus 1004, the memory 1003 receives input from other components, or stored information, such as an Internet access request sent by a mobile terminal or user identity information sent by a mobile terminal, is invoked by other components.

The processor 1002 is configured to execute a program, stored in the memory 1003, of an embodiment of the present invention, and implement bidirectional communications with another unit by using the bus 1004.

The display module 1005 may be configured to display information that is entered by a user or information that is provided for a user. An input unit 1006 may be configured to receive an input instruction of a user or provide an interface for external input.

The memory 1003 and the processor 1002 may be further integrated into a physical module for applying an embodiment of the disclosure, and a program that implements the embodiment of the disclosure is stored and run on the physical module.

All components of the management terminal 100 are coupled together by using the bus 1004, where the bus 1004 includes a data bus, and may further include a power bus, a control bus, a status signal bus, and the like. However, for clarity of description, various buses are marked as the bus 1004 in the diagram.

In this embodiment of the disclosure, units of the management terminal 100 separately execute the following content.

The communications module 1001 is configured to receive user identity information sent by a hotspot terminal, where the user identity information is used to identify a user who uses a mobile terminal, and the mobile terminal is a terminal that accesses an unencrypted wireless local area network WLAN established by the hotspot terminal and sends an Internet access request to the hotspot terminal.

The display module 1005 is configured to display the user identity information.

The user identity information includes at least one piece of information, for example, a user name, a user nickname, a user phone number, and user convention information.

The processor 1002 is configured to receive, by using the input module 1006, a permission confirmation instruction that is entered by an administrator according to the user identity information displayed by the display module 1005.

The processor 1002 is further configured to instruct, according to the permission confirmation instruction, the communications module 1001 to send the permission confirmation instruction to the hotspot terminal, so that the hotspot terminal determines Internet access permission of the mobile terminal.

The processor 1002 is further configured to set an Internet access condition of the mobile terminal after the communications module 1001 sends the permission confirmation instruction to the hotspot terminal.

The communications module 1001 is further configured to send the Internet access condition set by the processor 1002 to the hotspot terminal.

For the purpose of convenient and brief description, the management terminal in this embodiment of the disclosure is configured to execute a method in the foregoing method embodiments; for details, refer to a corresponding process in the foregoing method embodiments, and details are not described herein again.

In this embodiment of the disclosure, when a hotspot terminal receives an Internet access request of a mobile terminal, the hotspot terminal sends an input request to the mobile terminal, and the hotspot terminal receives a permission confirmation instruction that is entered by an administrator according to user identity information, and determines Internet access permission of the mobile terminal according to the received permission confirmation instruction. Thus, the problem where entering a password when the mobile terminal logs in to a remote network by using the hotspot terminal becomes complex and tedious is resolved. A convenient and efficient method for performing network connection by the mobile terminal by using the hotspot terminal is provided under the premise of ensuring that the mobile terminal can securely log in to the remote network by using the hotspot terminal. Furthermore, after a management terminal determines that a mobile terminal has the Internet access permission, the management terminal details Internet access limitations of different mobile terminals according to different MAC addresses of the mobile terminals, and sends the set Internet access limitations to the hotspot terminal. The hotspot terminal sends reminder information to the mobile terminals to inform whether Internet access requests of the mobile terminals are approved; different Internet access limitations are set according to different mobile terminals under the premise of ensuring that the mobile terminals log in to a remote network by using the hotspot terminal, so that the mobile terminals efficiently and quickly log in to the remote network.

A person of ordinary skill in the art may be aware that, in combination with the examples described in the embodiments disclosed in this specification, units, algorithms and method steps may be implemented by a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

It may be clearly understood by a person skilled in the art that, for the purpose of convenient and brief description, for a detailed working process of the foregoing apparatus and device, reference may be made to a corresponding process in the foregoing method embodiments, and details are not described herein again.

In the several embodiments provided in the present application, the disclosed device, apparatus and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the disclosure.

In addition, functional units in the embodiments of the disclosure may be integrated into one processing unit, or each of the units may exist alone physically, or two or more units are integrated into one unit.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely exemplary implementations of the embodiments of the disclosure, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A method of accessing an Internet service in a system comprising first and second electronic devices and a wireless router, the method comprises:
    scanning, by the first electronic device, for available networks in the system;
    displaying, by the first electronic device, names of first and second service set identifiers (SSIDs) for first and second available networks, respectively, provided by the wireless router,
        wherein the names of the first and second SSIDs indicate the first network is encrypted and the second network is not encrypted, and the names of the first and second SSIDs further indicate both the first and second networks are provided by a same wireless router;
    accessing, by the first electronic device, the second available network;
    displaying, by the first electronic device, an icon prompting a user of the first electronic device to request access to the Internet service;
    detecting, by the first electronic device, user interaction at the displayed icon in response to a request for access to the Internet service;
    displaying, by the second electronic device, an indication of an ID for the first electronic device in response to the detecting by the first electronic device of the user interaction with the displayed icon;
    detecting, by the second electronic device, a gesture from a user of the second device in response to the displayed indication of the ID, wherein the gesture confirms that the first electronic device is permitted to access the Internet service via the wireless router;
    permitting, by the wireless router, in response to the detecting by the second device, the first electronic device to access the Internet service;
    accessing, by the first electronic device, the Internet service via the wireless router; and
    setting, by the wireless router, an Internet access limitation for the first electronic device.

2. The method according to claim 1, wherein the ID for the first electronic device comprises at least one piece of information selected from the group consisting of: a user name, a user nickname, a user phone number, phone model, and user convention information.

3. A electronic device comprising at least one processor and a non-transitory computer readable medium coupled to the at least one processor, wherein
    the processor is configured to execute one or more applications, and
    the non-transitory computer readable medium is configured to store program codes which, when executed by the processor, cause the processor to:
    scan for available networks:
    display names of first and second service set identifiers (SSIDs) for first and second available networks, respectively, provided by a wireless router,
        wherein the name of the first SSID indicates the first network is encrypted, the name of the second SSID indicates the second network is not encrypted, and the names of the first and second SSIDs indicate access to both the first and second networks are provided by the wireless router;
    access the second network;
    display an icon prompting a user of the electronic device to request access to an Internet service;
    detect a user interaction with the icon and, in response, generating a request for accessing the Internet service, wherein the request comprising an ID of the electronic device;
    receive information indicating access to the Internet service is allowed; and
    access the Internet service via the wireless router, wherein an Internet access limitation for the electronic device is set.

4. The electronic device according to claim 3, wherein the ID of the electronic device comprises at least one piece of information selected from the group consisting of: a user name, a user nickname, a user phone number, phone model, and user convention information.

5. A wireless router comprising at least one processor and a non-transitory computer readable medium coupled to the at least one processor, wherein
    the processor is configured to execute one or more applications, and
    the non-transitory computer readable medium is configured to store program codes which, when executed by the processor, cause the wireless router to:
    provide first and second service set identifiers (SSIDs) for first and second available networks, names of the first and second SSIDs indicating that the first network is encrypted and the second network is not encrypted, and the names of the first and second SSIDs further indicating that both the first and second networks are provided by a same wireless router;
    receive a request from a first electronic device of accessing Internet services, wherein the request comprising an ID of the first electronic device;
    receive a response from a second electronic device confirming that the first electronic device is permitted to access the Internet service;
    allow the first electronic device to access the Internet service via the wireless router; and
    set an Internet access limitation for the first electronic device.

6. The wireless router according to claim 5, wherein the ID of the first electronic device comprises at least one piece of information selected from the group consisting of: a user name, a user nickname, a user phone number, phone model, and user convention information.

* * * * *

UNITED STATES PATENT AND TRADEMARK OFFICE
CERTIFICATE OF CORRECTION

PATENT NO. : 10,616,232 B2
APPLICATION NO. : 14/996000
DATED : April 7, 2020
INVENTOR(S) : Zhen Zhong Page 1 of 1

It is certified that error appears in the above-identified patent and that said Letters Patent is hereby corrected as shown below:

In the Claims

Claim 5: Column 20, Lines 50-51: "the first network is encrytpted and the" should read -- the first network is encrypted and the --.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*